US011884010B2

(12) United States Patent
Soto et al.

(10) Patent No.: US 11,884,010 B2
(45) Date of Patent: Jan. 30, 2024

(54) THREE-DIMENSIONAL ADDITIVE PRINTING METHOD

(71) Applicant: POIETIS, Pessac (FR)

(72) Inventors: Dan Soto, Merignac (FR); Fabien Guillemot, Preignac (FR); Bertrand Viellerobe, Merignac (FR); Aude Clapies, Pessac (FR)

(73) Assignee: POIETIS, Pessac (FR)

( * ) Notice: Subject to any disclaimer, the term of this patent is extended or adjusted under 35 U.S.C. 154(b) by 143 days.

(21) Appl. No.: 17/439,633

(22) PCT Filed: Mar. 20, 2020

(86) PCT No.: PCT/FR2020/050616
§ 371 (c)(1),
(2) Date: Sep. 15, 2021

(87) PCT Pub. No.: WO2020/193927
PCT Pub. Date: Oct. 1, 2020

(65) Prior Publication Data
US 2022/0152925 A1    May 19, 2022

(30) Foreign Application Priority Data
Mar. 22, 2019  (FR) ...................................... 1902998

(51) Int. Cl.
*B29C 64/205*    (2017.01)
*B29C 64/393*    (2017.01)
(Continued)

(52) U.S. Cl.
CPC .......... *B29C 64/205* (2017.08); *B29C 64/106* (2017.08); *B29C 64/268* (2017.08);
(Continued)

(58) Field of Classification Search
CPC ... B29C 64/205; B29C 64/393; B29C 64/106; B29C 64/268; B33Y 10/00; B33Y 30/00; B33Y 40/20; B41J 2/442
(Continued)

(56) References Cited

U.S. PATENT DOCUMENTS

2017/0002344 A1*  1/2017  Ringeisen ................ B41J 2/442
2017/0320263 A1   11/2017  Guillemot
(Continued)

FOREIGN PATENT DOCUMENTS

| FR | 3030361 A1 | 6/2016 |
| WO | WO-2017/004615 A1 | 1/2017 |
| WO | WO-2018/193446 A1 | 10/2018 |

*Primary Examiner* — Joseph S Del Sole
*Assistant Examiner* — Lawrence D. Hohenbrink, Jr.
(74) *Attorney, Agent, or Firm* — Harness Dickey & Pierce, PLC (57) ABSTRACT

A printing method employs a piece of equipment comprising an energy-delivering exciter that is orientable to produce a punctiform interaction with at least one ink that possibly contains non-uniformities and that is deposited on a printing medium including a transparent interaction area, in order to cause the transfer of a targeted portion of the ink to a receiver. The method includes a step of generating a wetting film at least partially covering the transparent interaction area, followed by a step of depositing the ink on the surface of the wetting film and transferring steps.

26 Claims, 6 Drawing Sheets (51) Int. Cl.
  *B29C 64/106* (2017.01)
  *B29C 64/268* (2017.01)
  *B33Y 10/00* (2015.01)
  *B33Y 30/00* (2015.01)
  *B33Y 40/20* (2020.01)
  *B41J 2/44* (2006.01)

(52) U.S. Cl.
  CPC .............. *B29C 64/393* (2017.08); *B33Y 10/00* (2014.12); *B33Y 30/00* (2014.12); *B33Y 40/20* (2020.01); *B41J 2/442* (2013.01)

(58) Field of Classification Search
  USPC ........................................................ 264/494
  See application file for complete search history.

(56) References Cited

U.S. PATENT DOCUMENTS

| | | |
|---|---|---|
| 2017/0368822 A1 | 12/2017 | Guillemot |
| 2020/0009877 A1 | 1/2020 | Viellerobe et al. |
| 2020/0010787 A1 | 1/2020 | Viellerobe et al. |
| 2020/0046520 A1 | 2/2020 | Guillemot et al. |
| 2020/0070514 A1* | 3/2020 | Batt .................... B41J 2/14104 |
| 2020/0102529 A1 | 4/2020 | Guillemot et al. |
| 2021/0220510 A1 | 7/2021 | Fayol et al. |
| 2021/0229342 A1 | 7/2021 | Guillemot |

* cited by examiner

THREE-DIMENSIONAL ADDITIVE PRINTING METHOD

CROSS-REFERENCE TO RELATED APPLICATIONS

This application is a National Phase Entry of International Patent Application No. PCT/FR2020/050616, filed on Mar. 20, 2020, which claims priority to French Patent Application No. 1902998, filed on Mar. 22, 2019, both of which are incorporated by reference herein.

TECHNICAL FIELD

The present invention relates to the field of three-dimensional additive printing, in particular laser-assisted, and more particularly, but not limited to, bioprinting, which is a technique for the spatial organization of living cells and other biological products by assembling them and using a computer-assisted layer-by-layer deposition method to develop living tissues and organs for tissue engineering, regenerative medicine, pharmacokinetics and more generally biological research. Laser-assisted three-dimensional additive printing consists in transferring elements to a target or "receiver," from a slide bearing an ink containing the elements transferable by a jet produced for example by the local vaporization of a substrate by a laser pulse, providing kinetic energy transferred directly to the ink which locally drives part of the liquid, a transferable particle or an aggregate of particles contained in the ink.

The transferable particles or non-uniformities contained in the ink can be of different natures. For the purposes of the present invention, the term "non-uniformity" means an area of interest of the ink, more commonly called bio-ink of organic, inorganic or living composition, in particular:
- nanoscopicnanoscopic particles such as exosomes or other vesicles produced by cells or nanoparticles of biomaterials (hydroxyapatite) or even nanocapsules of biomolecules (growth factors),
- microscopic particles such as living cells (eukaryotic cells, stem cells, globules, etc.), microparticles of biomaterials, microcapsules of biomolecules (growth factors),
- mesoscopic particles such as spheroids formed by clusters of cells, microcarriers whose surface is coated with cells and/or biomaterials.
- clusters of particles whose cohesiveness is ensured within a capsule or by a viscous liquid or gel. Preferably, in the context of bioprinting, the term "particles" is understood to mean objects having biological properties, such as, for example, living cells, exosomes or else biomolecules (for example macromolecules, proteins, peptides).

However, this equipment and the corresponding method do not stop at this definition according to the invention. Indeed, the particles can also be non-biological (that is to say, inert) and consist for example of one or more biomaterials, their nature depending on the intended application. Tissue engineering aims to design and develop substitute solutions that are biologically capable of replacing, restoring or maintaining the functions of a native tissue (epidermis, cornea, cartilage, epicardium, endocardium, etc.), or even of an organ. An example is described in the article by Griffith, L. G., & Naughton, G. (2002). Tissue engineering—current challenges and expanding opportunities. Science, 295 (5557), 1009-1014.

To overcome these drawbacks, the printing of biological elements, more commonly known as bio-printing, began to be conceived, as discussed in the articles of: Klebe, R. (1988). Cytoscribing: A Method for Micropositioning Cells and the Construction of Two- and Three-Dimensional Synthetic Tissues. Experimental Cell Research, 179(2): 362-373. And Klebe, R., Thomas, C, Grant, G., Grant, A. and Gosh, P. (1994). Cytoscription: Computer controlled micropositioning of cell adhesion proteins and cells. Methods in Cell Science, 16(3): 189-192.

The invention relates more particularly to the so-called "LIFT—Laser-Induced Forward Transfer" printing technique, otherwise called LAB (Laser Assisted Bioprinting) or BioLP (Bio Laser Printing), with a laser beam directed upward, the receiver being located above the ink medium. The medium on which the ink rests can be coated with a sacrificial absorbent layer, for example a layer of gold to aid the jet generation process by increasing the absorption of laser energy. In this case, the laser pulse is absorbed at the donor interface.

Alternatively, laser printing can be performed with an ink medium devoid of an absorbent layer. In this case, the characteristics of the laser and of the associated focusing means must be optimized in order to be able to generate the jet, such as for example exceeding the ablation threshold of the liquid (the ink) weakly absorbing the laser radiation in order to generate the plasma necessary to create the printing jet or even to generate the cavitation bubble directly by shock wave or by thermal effect. The ink is generally deposited on the medium by an operator using a micropipette to form an ink film on said medium, or by the circulation on a slide of an ink between an inlet channel and an outlet channel.

BACKGROUND

The general principle of printing a biological ink by a pulsed laser directed upward is described in French patent FR3030361.

International patent application WO 2018193446A1 describes a laser-induced direct transfer method in which a microfluidic chip is used as a printhead. The head comprises a transparent upper region, a middle region comprising an intermediate layer channel and an ink channel in fluid communication with said intermediate layer channel and a lower layer having an orifice in fluid contact with the ink channel. When the material in the intermediate layer channel is exposed to an energy source (usually a pulsed laser) at a point opposite the orifice, the material partially evaporates, creating a cavitation bubble that creates a transient pressure increase when it bursts, thereby forcing the ink out of the orifice to a receiving substrate below the slide.

This solution is not completely satisfactory because it only works with printing from a laser located above the slide, and which provides energy to "force" a particle to pass through a hole whose cross-section must be small enough not to allow the carrier fluid to flow. This causes multiple constraints which greatly limit the "transfer fluid/elements to be transferred" pair.

Patent application WO 2017004615A1 describes a material printing system consisting in using a receiving substrate; using a target substrate having a photon-transparent medium, a photon-absorbent interlayer coated on the medium, and a transfer material of a solid-phase microbiome sample coated on top of the interlayer opposite the medium; and directing the photon energy through the transparent medium so that the photon energy strikes the interlayer. A portion of the interlayer is energized by absorption of the photon energy, and the energized interlayer causes a transfer of a portion of the transfer material across a gap between the target substrate and the receiving substrate and onto the receiving substrate. This solution is not satisfactory either because it relates to mediums forming microwells, not allowing the circulation of a carrier fluid displacing the elements of interest.

SUMMARY

In order to address these drawbacks, the invention relates, in its most general sense, to a method, equipment and fluid printing medium according to claim 1. For the purposes of the present patent, the term "ink" will be understood to mean a uniform fluid or a fluid containing particles or non-uniformities or a bio-ink which is transferable under the effect of a laser pulse. Generally, the method comprises transfer steps by applying pulsed laser shots directed upward, and a subsequent step of regenerating a wetting film (by removing or reorganizing said fluid) covering said transparent interaction area. The laser shots are preferably directed upward.

For the purposes of the present patent, "transparent interaction area" will be understood to mean a solid, non-pierced area which allows a laser beam to pass in the wavelength band of said laser. For the other wavelengths, the area can be either transparent or opaque. For the purposes of the present invention, the term "non-uniformity" of the ink means any area of interest of the ink of organic, inorganic or living composition, in particular:

- nanoscopic particles such as exosomes or other vesicles produced by cells or nanoparticles of biomaterials (hydroxyapatite) or even nanocapsules of biomolecules (growth factors),
- microscopic particles such as living cells (eukaryotic cells, stem cells, globules, etc.), microparticles of biomaterials, microcapsules of biomolecules (growth factors),
- mesoscopic particles such as spheroids formed by clusters of cells, microcarriers (potentially biodegradable) whose surface is coated with cells or biomaterials,
- clusters of particles whose cohesiveness is ensured within a capsule or by a viscous liquid or gel.

Preferably, in the context of bioprinting, the term "particles" is understood to mean objects having biological properties, such as, for example, living cells, exosomes or else biomolecules (macromolecules, proteins, peptides, growth factor, messenger RNA, microRNA, DNA, etc.). The particles can also be non-biological (that is to say, inert) and consist for example of one or more biomaterials, their nature depending on the intended application. Advantageously, said step of forming a film of wetting fluid is carried out by injecting said wetting liquid at the periphery of a cylindrical space, the bottom of which is formed by said transparent interaction area. According to particular variant embodiments of the invention:

- The film of wetting liquid only partially comes into contact with the peripheral edge of said cylindrical space during the transfer step by successive applications of orientable energy excitation.
- The wetting film can be modified by an intermediate treatment step comprising photopolymerization, temperature change or gelation, in order to give said fluid specific properties other than wettability, for example to act as a sacrificial layer or else to photopattern the film in order to texture the slide and make microwells so as to control the spatial distribution of the particles in the bio-ink film. This step can be carried out before or during the interaction with the energetic printing means of the ink.
- The step of removing fluid is performed by suction from the periphery of said cylindrical space.
- The step of removing fluid is performed by suction from the top via an external aspirator.
- The cross-section of said film of wetting fluid is greater than the capillary length of said wetting fluid.
- A subsequent step of removing the fluid covering said transparent interaction area takes place after the printing steps.
- The step of forming a film of wetting fluid is carried out by supplying the interaction area with at least one channel receiving a volume of pressurized wetting fluid.
- The step of forming a film of wetting fluid is carried out by coating, by electrowetting or by centrifugation.
- The step of forming a film of wetting fluid is carried out by an air flow allowing contactless spreading.
- The step of removing a film of liquid is carried out by connecting the interaction area by at least one channel connected to a source of pressure below atmospheric pressure.
- The step of removing a film of liquid is carried out by connecting the interaction area by at least one channel connected to a source working in flow via a syringe pump and/or a peristaltic pump or even via MEMS systems for microfluidics.
- The step of removing a film of liquid is carried out by placing the cylindrical opening under overpressure relative to atmospheric pressure.
- The step of depositing ink is performed from the upper surface of said film of wetting fluid.
- The step of depositing an ink is carried out from the lower part of the equipment through an orifice opening out onto the central cylindrical interaction area.
- The method comprises steps of measuring the change in at least one physical property comprising the temperature, the pH, the viscosity or the position and orientation of an assembly.
- The assembly is positioned with a specific orientation with respect to the axis of propagation of the laser beam by a system of servomotors and feedback loops.
- The assembly is connected directly to a platform. This connection makes it possible to establish the fluidic connections quickly without having to integrate them into said printing medium.
- The non-uniform biological ink is stored in a tube whose internal diameter dimensions are preferably between 100 and 300 µm, but can range from 30 µm to 1 mm.

The invention also relates to a printing medium for an ink in interaction with an orientable energy-delivering exciting means to produce a punctiform interaction, for the implementation of the aforementioned methods, said medium having a transparent interaction area surrounded by a border in order to form a cylindrical space, characterized in that it has a plurality of channels opening into said border of the cylindrical space for injecting a wetting fluid of said transparent interaction area, and one or more suction channels opening into said border of the cylindrical space.

Advantageously, said suction channel opens into said border of the cylindrical space via a flared zone.

According to variants,

Several technical liquids are used, in particular a type of technical liquid which is favorable to wetting initially, said liquid being able to have other properties which are useful to the printing method (temperature, gelation, absorption, etc.), and a technical liquid which is favorable to cleaning after the interaction with the energy source.

the ink is routed to the central interaction space through the side channels the wetting film is formed by a method comprising vapor condensation, capillary wetting and electrowetting.

BRIEF DESCRIPTION OF THE DRAWINGS

The present invention will be better understood on reading the description which follows, with reference to the appended figures illustrating non-limiting embodiments, where.

DETAILED DESCRIPTION

Transfer Medium

Figure 1:
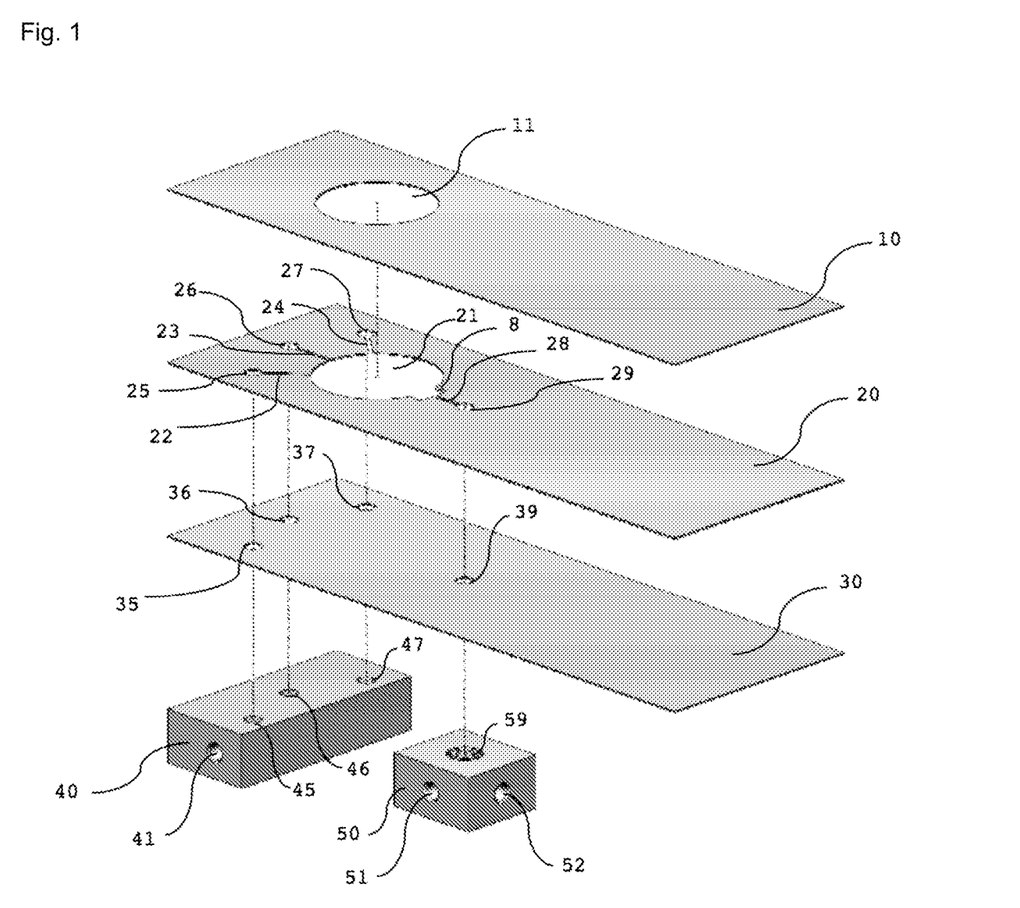
FIG. 1 shows an exploded view of a medium according to the invention.

FIG. 1 shows an exploded view of one embodiment of a transfer medium. It consists of an assembly of three cut slides (10, 20, 30) joined to form a block having an interaction area with the laser beam as well as supply channels with a wetting and suction fluid for the removal of the liquid present on the interaction area. These slides (10, 20, 30) are typically made of glass or silicon and/or of a polymer (sterilizable or non-sterilizable), for example COC, PMMA, PolyEtherEtherKetone PEEK. Alternatively, the lower slide (30) is made of a material transparent at 1030 nm (wavelength of the laser used), the other slides (10, 20) being able to be transparent or opaque.

The upper slide (10) is a rectangular part having a thickness for example of between 100 micrometers and several millimeters. It has a round cutout (11) corresponding to a cutout (21) provided at the same location as the cutout on the intermediate slide (20). This intermediate slide (20) also has a thickness of between 100 micrometers and several millimeters. The opening (11) of the slide (10) may have a different geometry from that of the opening (20). In particular, it can be circular and have a larger or smaller radius.

In addition to the round cutout (21), it has three cutouts (22, 23, 24) extending radially relative to the round cutout (21) and terminating at the opposite end of the circular bulges, respectively (25, 26, 27). These bulging cutouts form channels, one of which is oriented along the longitudinal axis of the slide (20), and the others are arranged on either side of the median channel, the axis of the cutouts (22, 24) of the outer channels forming an angle with the axis of the cutout (23) of the median channel of approximately 45° in order to define a supply arc of approximately 90° in the cylindrical wall of the cutout (21). These values relate to the example illustrated in FIG. 1; other configurations (number of channels, positioning of the channels, thickness of the slides, etc.) can be envisaged as needed.

The cross-section of the cutouts (11) and (21) is determined as a function of the capillary length of the wetting fluid. It is slightly greater than the capillary length L of the wetting fluid so as to limit the capillary effects and thus facilitate optimum spreading of the wetting fluid. The upper limit is determined by the area scanned by the orientable pulsed laser.

The capillary length L is determined as follows:

$$L = \frac{TS}{MV \cdot g} \quad \text{[MATH1]}$$

Where:

TS denotes the surface tension of the wetting fluid

MV denotes the density of the wetting fluid g designates the gravitational acceleration of 9.806 m·s$^{-2}$ In the case of a wetting liquid consisting of pure water at 20°, this capillary length L is equal to 2.7 millimeters for a surface tension of 70·10$^{-3}$ N·m$^{-1}$.

On the side opposite the cutouts (22 to 24), the slide (20) has another cutout (28) extended by a bulge (29), oriented radially along the longitudinal axis of the slide (20). This cutout (28) is connected to the edge of the round cutout (21) by a flared zone (8) to form a funnel facilitating the suction of the liquid deposited in the cylindrical space defined by the cutout (21). Here again, the example illustrated here is only one embodiment; other configurations (number of outlet channels, positioning of the outlet channels, geometry, etc.) can be envisaged as needed.

The lower slide (30) has no central cutout and forms the bottom of the cylindrical space defined by the cutouts (11, 21). It is for example made of a material which is transparent in the wavelength of the pulsed laser beam. It has three holes (35, 36, 37) positioned in accordance with the bulges, respectively (25, 26, 27), of the intermediate slide (20) to form vertical channels for supplying the cutouts, respectively (22, 23, 24). A fourth hole (39) is positioned in accordance with the bulge (29) of the intermediate slide (20) so as to define a vertical suction channel opening into the duct formed by the cutout (28). The slides are associated by gluing, for example (the material of the slides (20) can itself act as a heat-activatable or heat-bondable polymer), the cutouts (22, 23, 24, 28 and 8) of the intermediate slide (20) being closed at their upper and lower surfaces by the upper (10) and lower (30) slides, respectively, to form channels opening into the annular wall surrounding the round cutout (21) of the intermediate slide (20).

This assembly is completed by a supply unit (40) and a suction unit (50). The supply unit (40) has a transverse channel (41) into which perpendicular channels (45, 46, 47) open which are positioned to open into the holes (35, 36, 37) of the lower slide (30).

The suction unit (50) has a vertical channel (59), the position of which is determined to open into the bulge (39) of the lower plate (30). The other end of this channel (59) opens into two perpendicular channels (51, 52), one serving for the suction of the liquid contained in the cylindrical space defined by the cutout (21) of the intermediate slide (20), the other being used for the optional injection of a cleaning liquid. The suction unit (50) could therefore also play the role of the supply unit (40) for certain configurations. Around the end of the channel (59), there is a recess making it possible to accommodate any excess glue.

Supply System

Figure 2:
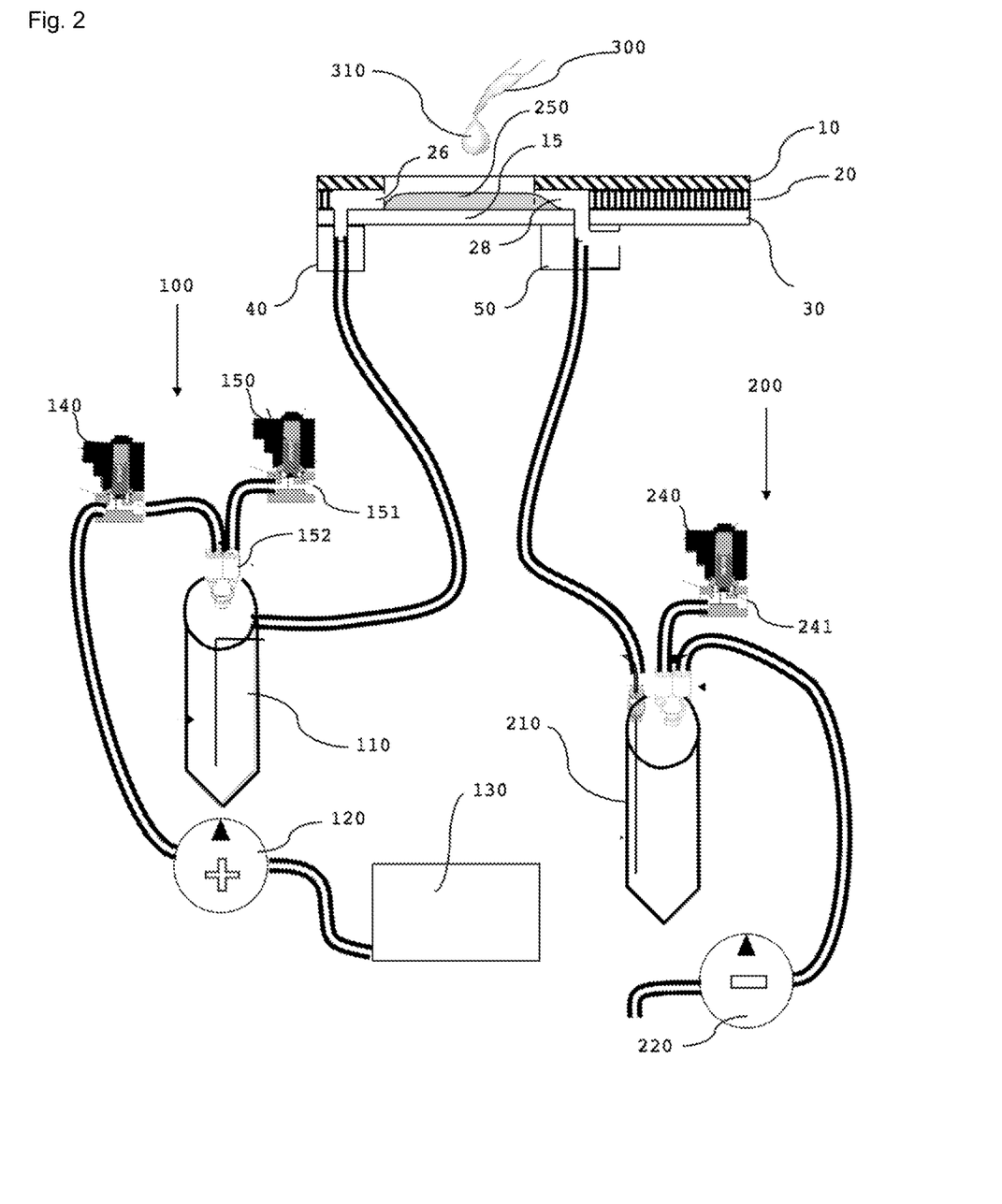
FIG. 2 shows a schematic view of the fluid circuit.

The fluid system illustrated in FIG. 2 consists of a supply sub-assembly (100) and a suction sub-assembly (200). Various solutions can be considered, in particular a peristaltic solution. The wetting fluid supply system (100) comprises a vial (110), typically a sterile polystyrene vial connected to a pump (120) supplied by a wetting fluid reservoir (130), for example sterile water or a biological buffer solution such as PBS or HEPES making it possible to avoid osmotic shock for the cells.

A first normally closed solenoid valve (140) controls the supply of the vial (110) by the pump. A second normally open solenoid valve (150) is placed between an air intake (151) and a connector (152) open on the interior volume of the vial (110). At rest, the solenoid valve (140) is closed and the solenoid valve (150) is open, thus the volume of the vial is subjected to atmospheric pressure. When it is desired to transfer fluid from the vial (110) to the interaction area (15), the opening of the first solenoid valve (140) is controlled to apply a pressure greater than atmospheric pressure in the vial (110) and the supply is controlled by closing the second solenoid valve (150) in a controlled manner, so as to form a wetting film (16) on the surface of the interaction area (15).

The suction circuit (200) comprises a second vial (210) connected to the outlet of the medium. This second vial (210) can be put under vacuum by a pump (220) or a vacuum reservoir. A normally open solenoid valve (240) opening onto a vent (241) brings the vial (210) to atmospheric pressure at rest. When it is necessary to suction the liquid (16) deposited on the interaction area (15), the solenoid valve (240) is closed and the liquid suctioned in the vial (210) is recovered.

Figure 3:
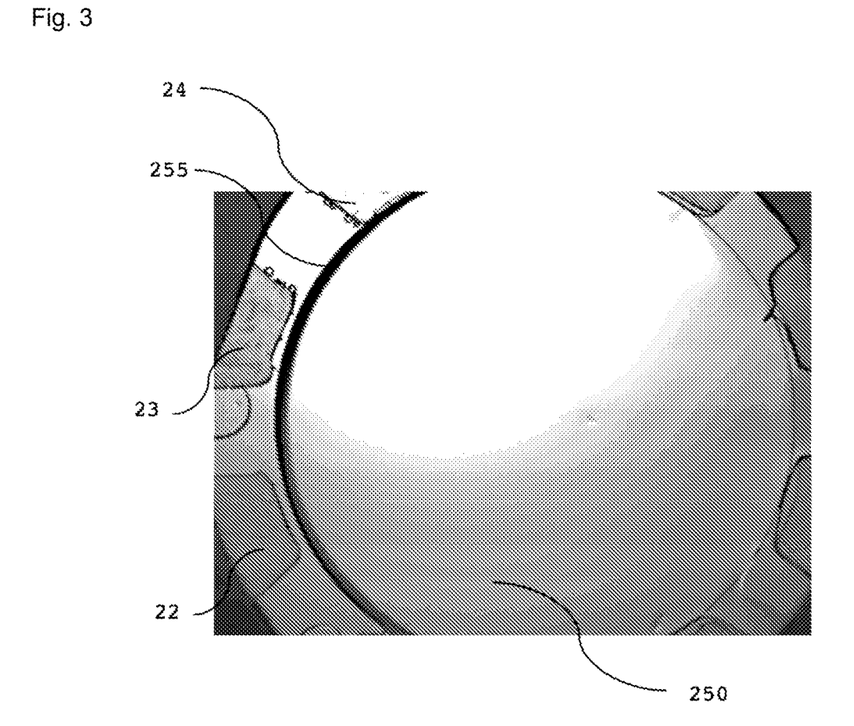
FIG. 3 shows a top view of the transfer area.

As illustrated in FIG. 3, the wetting liquid first forms a film connecting (23) and (28), then it is modified (reduced) by aspirating liquid on the interaction area, leaving a semi-annular space (255) between the edge of the cylindrical space defined by the cutouts (11, 21) and the edge of the film (250), called the pre-wetting film. As a result, the meniscus (250) deposited on the interaction area may not communicate with the fluid contained in the supply channels (22 to 24), which prevents liquid from returning to the supply circuit. A version with communication between (250) and (22 to 24) is also possible, especially with a thrust and suction system with peristaltic pumps.

The wetting fluid flow exhibits a relatively high Reynolds number, greater than 2000 in some areas. This parameter makes it possible to describe the evolution of the boundary layer to create a turbulent flow over the interaction area.

The residual pre-wetting film (250) (after suction) has a smaller thickness than the thickness of the ink film which will be deposited on it. Furthermore, the nature of the pre-wetting liquid must ensure total harmlessness with respect to the cells of the bio-ink, which is why it consists of bio-compatible and/or sterile elements. The pre-wetting liquid can be structured before or after the deposition of the ink, for example using a flash of light which generates a honeycomb structure by photopolymerization making it possible to create defined microwells on the cartridge.

The wetting surface could also be generated by methods of biochemical grafting, of depositing thin layers or of treatment of materials without use of a pre-wetting fluid. When the pre-wetting film (250) is formed, a drop (310) of biological ink is deposited on the surface of the fluid (250) using a pipette (300) or a syringe pump system, for example.

The biological ink is spread over the resulting wetting surface via the wetting fluid (250). It is then possible to fire the laser pulses. After the sequence of shots, the liquid is aspirated with the suction circuit and/or it is pushed by the thrust circuit, and a cleaning liquid can be injected before the start of a new sequence.

Variant Embodiment of the Medium

Figure 4:
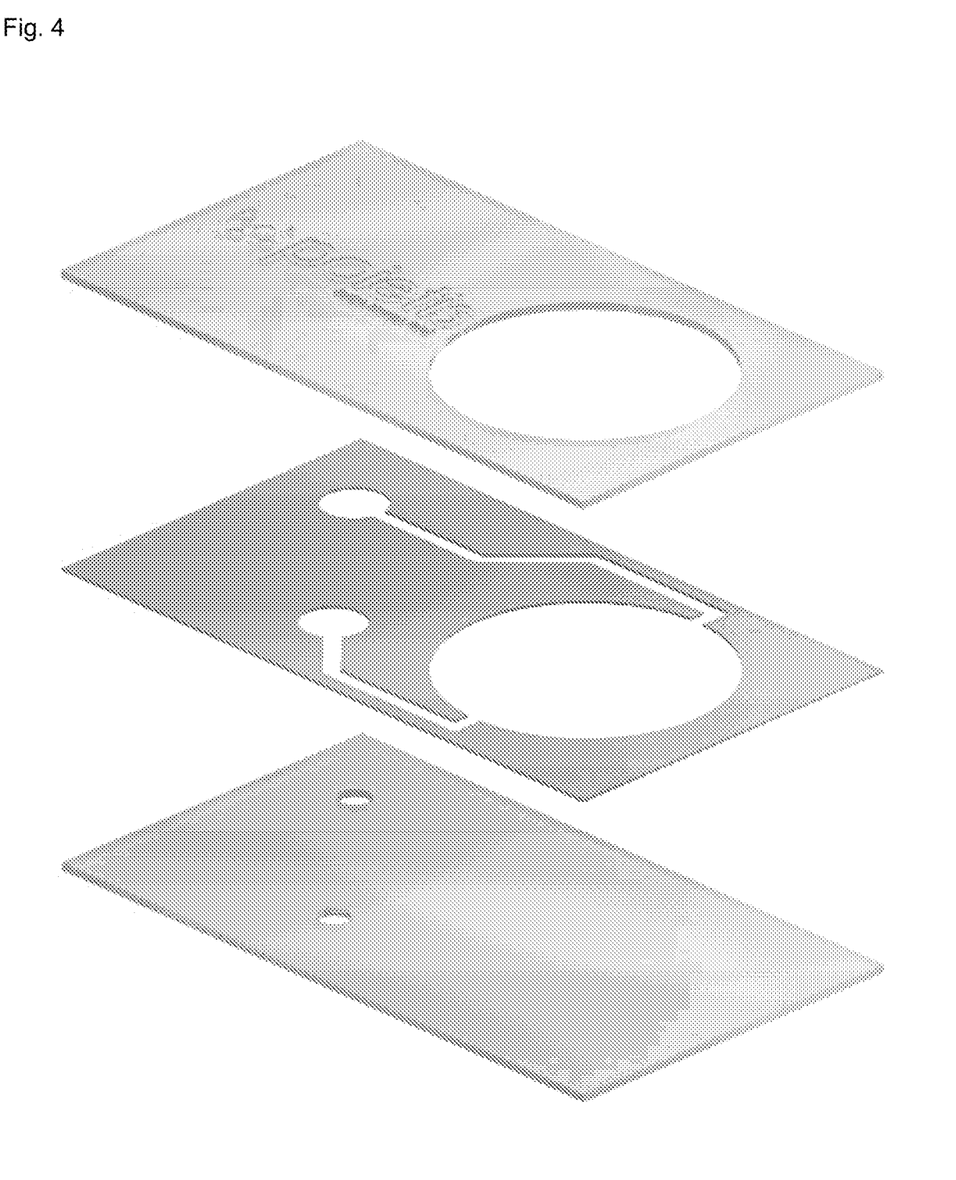
FIG. 4 shows an exploded view of a medium according to a variant embodiment of the invention.

FIG. 4 shows an exploded view of a variant embodiment of a transfer medium. It is formed like in the first embodiment described with reference to FIG. 1 by an assembly of three cut slides (10, 20, 30) joined to form a block having an interaction area (11) with the laser beam as well as supply channels with a wetting and suction fluid for the removal. These slides (10, 20, 30) are typically made of glass or silicon and/or of a polymer (sterilizable or non-sterilizable), for example COC, PMMA, PolyEtherEtherKetone (PEEK). Alternatively, the lower slide (30) is made of a material transparent at 1030 nm (wavelength of the laser used), the other slides (10, 20) being able to be transparent or opaque.

The upper slide (10) is a rectangular piece measuring 41.5×23.5 millimeters with a thickness of 0.5 millimeters. It has a round cutout (11) with a diameter of 17.5 millimeters.

The intermediate slide (20) is cut from a sheet of a material such as silicone or a plastic material, or else glass which has the same width and length, and a thickness of 0.15 to 0.16 millimeters, typically between 0.1 and 0.35 millimeters. It also comprises a cutout (21) which can be superimposed on the cutout (11). This thin sheet also has two circular cutouts (216, 217) with a cross-section of 2 millimeters connected to the circular cutout (21) by tracks cut with a width of 1 millimeter.

The track connecting the cutout (20) to the circular cutout (216) has a first arm (212) extending transversely, radially with respect to the cutout (20), and a cutout (218) connecting the end of this arm (212) to the cutout (216). The track connecting the cutout (20) to the circular cutout (217) has a first arm (213) extending transversely, radially with respect to the cutout (20), and a cutout (219) connecting the end of this arm (212) to the cutout (217).

The lower slide (30) is a rectangular piece with the same dimensions as the first slide (10), 41.5×23.5 millimeters with a thickness of 0.5 millimeters. It is this slide which is transparent in the laser wavelength band and transparent or opaque in the other wavelength bands. It has two round through cutouts (11) with a diameter of 17.5 millimeters, which are able to be superimposed with the cutouts (216, 217) of the intermediate slide (20). The circular area corresponding to the cutouts (11, 21) can optionally be coated with a sacrificial layer, for example gold, depending on the type of laser excitation envisaged.

By assembling these three slides (10, 20, 30), a microfluid medium is defined with two fluid inlet-outlet orifices passing through the lower slide (30) and the intermediate slide (20), and closed by the upper slide (10). This medium also has an interaction area defined by the cutouts (11, 21) passing through the upper slide (10) and the intermediate slide (20) and closed by the transparent bottom formed by the lower slide (30). Two channels formed by the cutouts (212, 218; 213, 219) closed at the upper surface by the slide (10) and at the lower surface by the slide (20). The medium thus forms a fluid head comprising a circuit for circulating a technical ink entering the interaction area through one of the orifices (216, 217) and emerging through the other orifice, after having formed a meniscus on the interaction area.

Manufacturing Method

The manufacture of such fluid mediums begins with the preparation of rectangular glass slides measuring 50×75×1 or 50×75×1.6 mm or glass wafers with a diameter of 6 or 8 inches. The second step consists in pouring a polymer on a glass slide, which will harden when its temperature is increased. This polymer is, for example, polydimethylsiloxane (PDMS), which has the particularity of being liquid at room temperature and hardening upon heating. The curing step makes it possible to solidify the PDMS. In order to form a thin and uniform layer, from 0.1 to 0.2 millimeters, a rapid spin coating is carried out.

The third step consists in making the circular cutouts in the glass slides intended to form the upper layer (10) on the one hand, by drilling for example. The circular cutouts (21) and the tracks (212, 216, 218; 213, 217, 219) are produced on the other hand by a laser, by wet chemical etching ("wet etching") or by cutting. The next step consists in combining the three layers, by pressure at the solidification temperature of the PDMS layer, for example. The intermediate glass layer can be replaced by a glass layer, and in this case the association can be done by thermal bonding.

A step of depositing a layer of gold on the circular surface of the lower slide (30) is then carried out by vacuum deposition in the zone delimited by the cutouts (11, 21). Then the fluid medium is cleaned, packaged and sterilized.

Description of a Printing Machine

Figure 5:
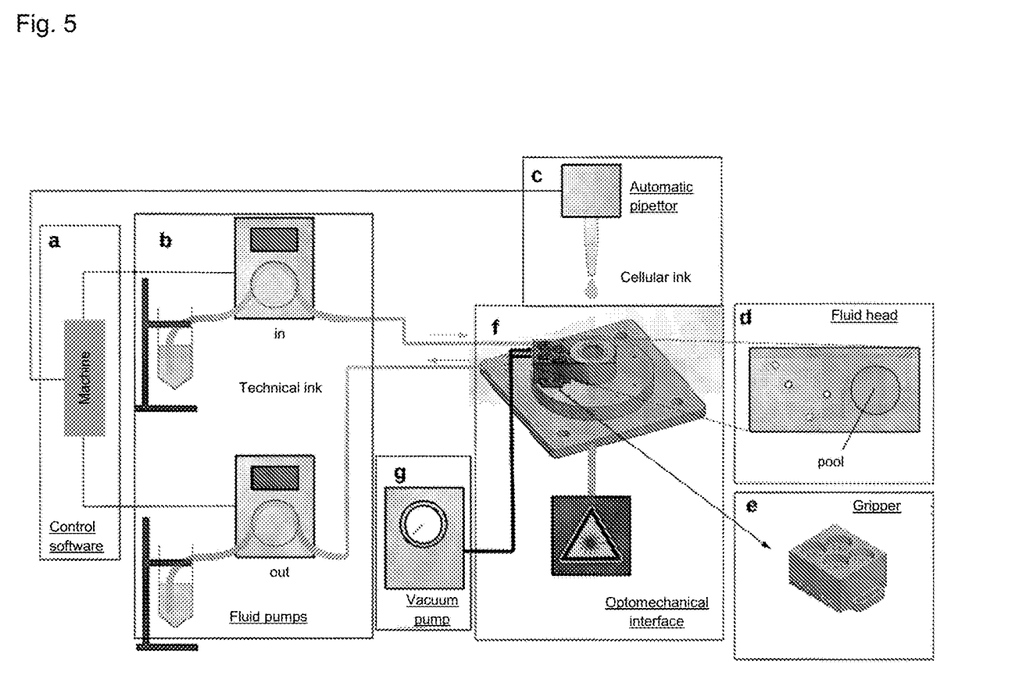
FIG. 5 shows a schematic view of a bioprinting installation according to the invention.

FIG. 5 shows the block diagram of a printing machine using a fluid head (1000) as previously described. The interaction area is positioned on a gripper (2000) comprising fluid connectors for connecting a supply duct (5011) and a drain duct (5010). The gripper (2000) is mounted on an interface plate (3200) having a vertical through channel (3210), for the passage of the laser beam (3100) through the interaction area of the fluid medium (1000). A pipettor (4000) supported by a robotic arm makes it possible to deposit a drop of cellular ink on the interaction area of the fluid medium (1000).

The biological ink circuit comprises a first peristaltic pump (5001) for supplying the interaction area of the fluid medium (1000) from a reservoir (5004), and a second peristaltic pump (5002) ensuring the aspiration of the contents of the interaction area of the fluid medium (1000) and the discharge into a collector (5003). An electronic control circuit (6000) controls the operation of the two peristaltic pumps (5001, 5002) as well as of the pipettor (4000) and of the robotic arm which controls its positioning relative to the fluid medium (1000). The equipment also comprises a vacuum pump connected to the gripper (2000). This equipment makes it possible to limit the elements in contact with the cellular ink to the single pipettor (4000) and to the fluid medium (1000), as well as the supply reservoir (5004) and the collector (5005), all the other elements of the equipment being without contact with the biological ink.

Detailed Description of the Gripper.

Figure 6:
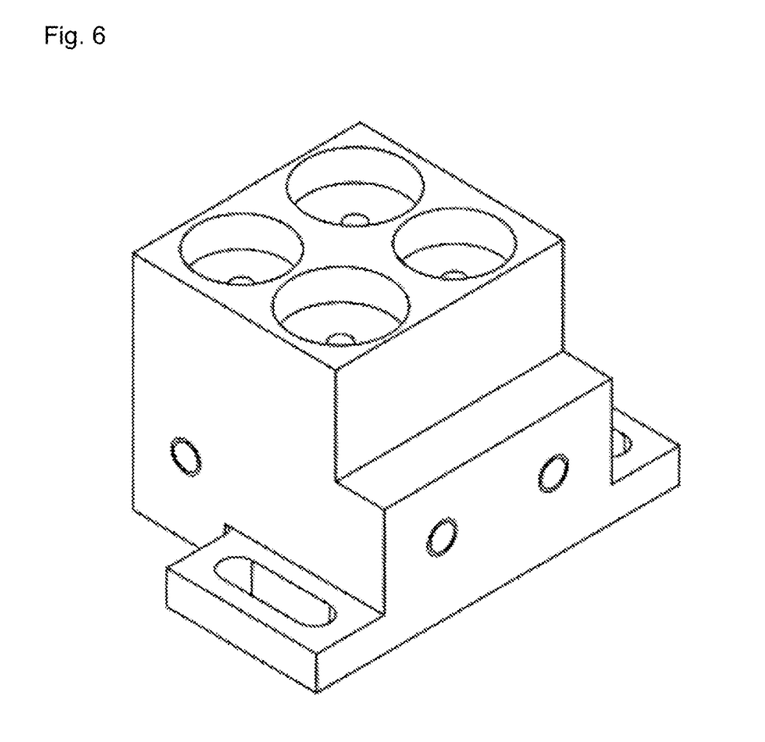
FIG. 6 shows a perspective view of a printhead gripper according to the invention.
Figure 7:
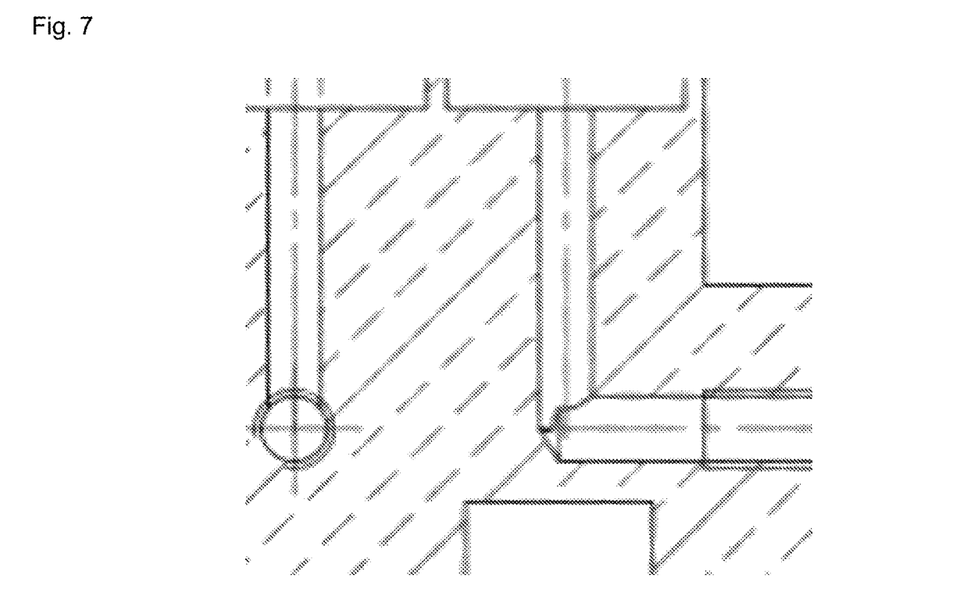
FIG. 7 shows a sectional view of this printhead gripper according to the invention.

FIGS. 6 and 7 show a detailed view of one embodiment of a gripper (2000) for a fluid medium (1000). The active cavity formed on the printing medium forms a sort of Petri dish in which the particles of interest to be transferred to the receiver by a laser pulse are present. The difficulty is to ensure very precise positioning of the fluid medium (1000) relative to the focal point of the laser for the entire useful interaction area of the fluid medium (1000). The expected accuracy is typically ±20 μm. To achieve such precision, knowing that the fluid mediums (1000) are interchangeable is intended to be placed and removed repeatedly, while each time having precise positioning relative to the focal plane of the excitation laser.

To this end, the gripper (2000) is machined from a metal block which can be magnetized. This solid block has a perfectly flat upper surface (2010), into which four cylindrical seal housings (2011 to 2014) emerge. A first pair of bent channels (2021, 2023) connects two of the cavities (2011, 2013) to fluid connectors (2033) provided on the side faces. A second pair of angled channels (2022, 2024) connects the other two cavities (2012, 2014) to pneumatic connectors (2032, 2034) provided on the front face.

Two of these fluid connectors are used to connect the vacuum ducts connected to the vacuum pump (7000) which is intended to create a depression keeping the fluid medium (1000) applied against the upper surface (2010) of the gripper (2000), by a suction effect, with great force and precision. Depending on the control of the vacuum pump (7000), the fluid medium is kept in position or released.

The other two cavities (2011, 2013) are intended to transmit the fluid entering and leaving the fluid medium (1000). Their positions correspond to the positions of the orifices (216, 217). These cavities (2011, 2013) comprise a seal and communicate with fluid connectors (2031, 2033) intended for the connection of the ducts connecting the peristaltic pumps (5001 and 5002.

The gripper is fixed on the excitation head, in particular on the edge of the window allowing the excitation laser beam to pass, by a magnetic connection or by bolts passing through the passages (2051, 2052) provided on the tabs (2061, 2062). The upper face of the fluid medium (1000) is placed alternately facing the automatic pipettor (4000) to deposit the substances of interest on the fluid film formed in the cavity of the fluid medium (1000), or opposite the receiver on which the substances of interest are deposited by the bioprinting process. The two elements are positioned using a robotic arm.

Operating Principle

The system according to the invention makes it possible to carry out a bioprinting cycle in a sterile closed chamber, completely automatically, without human intervention, which makes it possible to avoid any risk of contamination or pollution of the receiver. The entire method is broken down into 5 distinct steps, and each step responds to certain constraints.

First Step—Supplying Consumables

At the start of the manipulation, the experimenter installs the disposable consumables composed of the fluid tubes, technical ink, in particular the technical ink source (5004) and the waste receptacle (5003), cellular ink, cones for the pipettor, receiver, head and gripper with these connections. To facilitate installation by the user, the system uses peristaltic pumps (5001, 5002) allowing easy connection with these fluid tubes. Printing a 40 $cm^2$ tissue requires around 40 printing cycles; if 1 ml of technical ink is used for 1 cycle, this means that 40 ml of technical ink is needed. The volume of technical ink used per cycle must be minimized.

Second Step: Priming the Interaction Cavity of the Fluid Medium.

The purpose of priming is to fill the tube, the inlet channel of the fluid medium (1000) as well as the cavity. Bubbles should be avoided in the tube and the cavity seal during filling. These bubbles will then move into the container during the method and interfere with its smooth progression. To this end, the two peristaltic injection (5001) and suction (5002) pumps are controlled in a coordinated manner to push hard while aspirating during priming in order to eliminate the bubbles.

Third Step: Pattern Printing Cycle

This step will be cycled as many times as it is possible to fire at the same cartridge. Using two peristaltic pumps (5001, 5002) makes it possible to establish a continuous fluid bridge between the inlet (212) and the outlet (213) of the fluid medium and to avoid any disturbance resulting from local drying forming a barrier to the flow of technical ink. This fluid bridge makes it possible to establish contact between the inlet and the outlet of the fluid medium because if there is no contact, the suction does not influence the liquid present in the cavity. The fluid bridge makes it possible in particular to push back the contact line in order to completely wet the interaction cavity.

Suction is carried out in order to reduce the thickness of the film and to break the contact between the film and the rest of the fluid system (channels and edges of the cavity). It is desirable to ensure the reproducibility of the film. It must always have the same profile and the same thickness. Control of the pre-wetting film is critical for the reproducibility of the spreading.

In addition, the fluid contact must be broken; otherwise, the cells can be suctioned into the channels by capillary action. To this end, an anchoring line can be etched on the cavity in order to fix the contact line of the pre-wetting film.

Fourth Step: Cellular Ink Deposition

This deposition is done by the robotic arm. To prevent cell clusters from forming during the deposition and adversely affecting the uniformity of the spreading, the pipettor must homogenize the cell ink solution just before the deposition.

Fifth Step: Installation of the Receiver:

This step is performed by the robotic arm.

Bio-Printing Step

A succession of laser shots is then performed on the cavity of the fluid medium (1000) in order to print the pattern on the receiver. The cycle is then started over from the beginning of the cycle as long as the cartridge can be pulled.

In the case of a solution using a sacrificial layer, the number of shots possible on a fluid head is limited by the ablation of gold in the laser printing method. Indeed, it is not possible to shoot at the same place because the absence of gold prevents the transfer of the pattern. With the square pattern of drops spaced 500 µm apart, and a current spot of 50 µm, 100 patterns are theoretically possible. However, deformation of the gold surface around the spot after firing has been observed, and removal in this area may decrease the quality of the print. When the printing of the tissue is finished, the tubes can be emptied by using both of them in suction and the consumables can be discarded.

The invention claimed is:

1. A printing method implementing a piece of equipment comprising an energy-delivering exciter orientable to produce a punctiform interaction with at least one ink that possibly contains non-uniformities and that is deposited on a printing medium having a transparent interaction area, in order to cause a transfer of a targeted portion of said ink to a receiver, wherein the method comprises generating a wetting film at least partially covering said transparent interaction area, followed by depositing said ink on the surface of said wetting film.

2. The printing method according to claim 1, wherein said generating the wetting film is carried out by injecting a wetting liquid at a periphery of a cylindrical space, a bottom of which is formed by said transparent interaction area.

3. The printing method according to claim 2, wherein said film of said wetting liquid only partially comes into contact with said periphery of said cylindrical space during said transfer step by successive applications of orientable energy excitation.

4. The printing method according to claim 2, wherein said wetting film is modified by an intermediate treatment step comprising photopolymerization, temperature change or gelation, in order to give said wetting film specific properties other than wettability.

5. The printing method according to claim 1, further comprising a subsequent step of removing said ink covering said transparent interaction area taking place after printing steps.

6. The printing method according to claim 5, wherein said step of removing said wetting film is performed by suction from a periphery of a cylindrical space.

7. The printing method according to claim 5, wherein said removing step is performed by suction from a top via an external aspirator.

8. The printing method according to claim 2, wherein a cross-sectional width dimension of said wetting film is greater than a capillary length of said wetting fluid.

9. The printing method according to claim 2, wherein said step of generating said wetting film is carried out by supplying said interaction area with at least one channel receiving a volume of pressurized wetting fluid.

10. The printing method according to claim 2, wherein said step of generating said wetting film is carried out by coating, by electrowetting or by centrifugation.

11. The printing method according to claim 2, wherein said step of generating said wetting film is carried out by an air flow allowing contactless spreading.

12. The printing method according to claim 1, further comprising removing a film of liquid by connecting said interaction area by at least one channel connected to a source of pressure below atmospheric pressure.

13. The printing method according to claim 1, further comprising removing a film of liquid by connecting said interaction area by at least one channel connected to a source working in flow via a syringe pump and/or a peristaltic pump or MEMS systems for microfluidics.

14. The printing method according to claim 1, further comprising removing a film of liquid by placing a cylindrical opening under overpressure relative to atmospheric pressure.

15. The printing method according to claim 1, wherein said step of depositing said ink is performed from an upper surface of said wetting film.

16. The printing method according to claim 1, wherein said step of depositing said ink is carried out from a lower part of the equipment through an orifice opening out onto a central cylindrical interaction area.

17. The printing method according to claim 1, further comprising measuring a change in at least one physical property comprising a temperature, a pH, a viscosity, or a position and orientation of an assembly.

18. The printing method according to claim 1, further comprising positioning an assembly with a specific orientation with respect to an axis of propagation of a laser beam by a system of servomotors and feedback loops.

19. The printing method according to claim 1, further comprising connecting an assembly directly to a platform.

20. The printing method according to claim 1, further comprising storing said ink comprising said non-uniformities in a tube whose internal diameter dimensions are between 30 µm to 1 mm.

21. The printing method according to claim 1, further comprising locating said receiver above said printing medium.

22. The printing method according to claim 1, further comprising loading said ink with bio-ink particles.

23. A printing medium for an ink in interaction with an orientable energy-delivering laser to produce a punctiform interaction, said medium comprising:

a transparent interaction area surrounded by a border in order to form a cylindrical space;

a plurality of channels opening into said border of said cylindrical space operably injecting a wetting fluid of said transparent interaction area;
one or more suction channels opening into said border of said cylindrical space; and
a wetting film being configured to be formed by vapor condensation, capillary wetting and electrowetting.

24. Printing medium according to claim 23, wherein said one or more suction channels opens into said border of said cylindrical space via a flared zone.

25. The printing medium according to claim 23, wherein several technical liquids are used, which are favorable to wetting initially, said liquids being able to have other properties which are useful to printing temperature, gelation and absorption, and a technical liquid which is favorable to cleaning after an interaction with said energy-delivering laser.

26. The printing medium according to claim 23, wherein said ink is routed to a central interaction space through side channels.

* * * * *